United States Patent Office 3,704,286
Patented Nov. 28, 1972

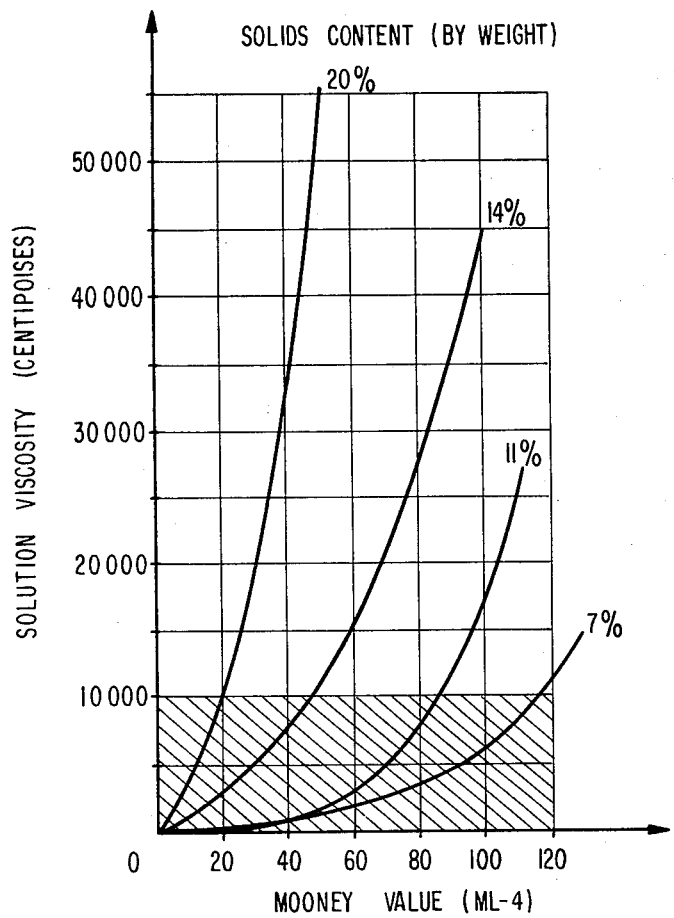
SOLUTION VISCOSITY AS A FUNCTION
OF SOLIDS CONTENT AND MOONEY VALUE

3,704,286
PRODUCTION OF UNSATURATED POLYMERIC HYDROCARBONS HAVING HIGH MOONEY VISCOSITIES
Johannes Schafer, Gerhard Berg, and Kurt Benedikter, Marl, Germany, assignors to Chemische Werke Huls, AG, Marl, Germany
Continuation of applications Ser. No. 513,622, July 30, 1965, and Ser. No. 804,372, Feb. 26, 1969. This application Dec. 29, 1969, Ser. No. 888,155
Claims priority, application Germany, July 30, 1964, P 14 95 370.9
Int. Cl. C08d 5/04, 5/02
U.S. Cl. 260—94.7 R
9 Claims

ABSTRACT OF THE DISCLOSURE

To increase the molecular weight of unsaturated polymeric hydrocarbons, such as butadiene, produced on the basis of Ziegler-type catalysts, after the termination of polymerization or the desired conversion has been reached, adding to the resultant reaction solution a compound of the formula RX wherein R is a residue selected from the group consisting of halogeno, alkyl, cycloalkyl, aryl, aralkyl, acyl thionyl, sulfuryl, chromyl, vanadyl, phosphorus oxy, thiophosphorus, sulfonic acid, sulfinic acid, arsenic oxy, antimony oxy, titanyl, and imide, or a component selected from the group consisting of phosphorus, arsenic, sulfur, selenium, silicon, and tin, and X represents at least one halogen atom.

---

This application is a continuation of application Ser. No. 804,372, filed Feb. 26, 1969, and application Ser. No. 513,622, filed July 30, 1965, both applications having been abandoned.

This invention relates to a process for the production of unsaturated polymeric hydrocarbons having high Mooney viscosities.

In the production of polymeric hydrocarbons by catalytic solution polymerization, the viscosity of the reaction mixture normally increases with increasing conversion, the increase in viscosity being dependent upon the concentration and the molecular weight of the dissolved polymer. With increasing viscosity, however, it becomes more and more difficult to remove the heats of polymerization and agitation. Therefore, to avoid runaway reactions, the polymer concentration is normally maintained at values between 5 and 20%, and the Mooney viscosity (ML–4) about 30 to 100.

Today, polymers having high Mooney viscosities (100 to 150) are of ever increasing technical importance, but though there are a number of modified polymerization processes for their production, such processes can be conducted only with substantial difficulties. For example, if low space-time yields or impractical reaction conditions are to be avoided, it is often necessary to employ extremely pure reaction components and solvents.

Likewise, though it has been suggested to increase the molecular weight of polybutadiene or polyisoprene by adding to the polymerization mixture arylazo or arylhydrazo compounds in quantities of 0.2 to 3 percent by weight, these azo compounds are relatively ineffective with other unsaturated polymeric hydrocarbons, yielding little or no increase in molecular weight.

Furthermore, it is known that butadiene copolymers containing nitrile groups can be cross-linked with a metallic halogenide of the Lewis acid type and a liquid halogen compound having at least two mobile halogen atoms. This is accomplished by mixing these two compounds into a liquid solvent-free copolymer—before or after admixture of carbon black and heating to 150° C. Although this cross-linking technique does in fact increase polymolecular weight, the final products have limited utility.

An object of this invention, therefore, is to provide an improved process for the production of polymers having high Mooney viscosities.

Upon further study of the specification and claims, other objects and advantages of the present invention will become apparent.

To attain the objects of this invention, it has now been discovered that the molecular weight of unsaturated, polymeric hydrocarbons, produced by the homopolymerization of diolefins or copolymerization of mono-olefins with diolefins, or copolymerization of various diolefins with one another in inert organic solvents with Ziegler-type mixed catalysts can be increased in a definite manner by adding to the reaction mixture, or to a mixture of different reaction mixtures, after either termination of the polymerization proper, or after the desired conversion has been reached, but before the catalyst is decomposed, compounds of the formula $$RX$$

wherein

R is a halogen, alkyl, cycloalkyl, aryl, aralkyl, acyl, thionyl, sulfuryl, chromyl, vanadyl, phosphorus oxy, thiophosphorus, sulfonic acid, sulfinic acid, arsenic oxy, antimony, oxy, titanyl, or imide residue, phosphorus, arsenic sulfur, selenium, vanadium, titanium, tin, silicon, and X reprssents halogen.

These RX compounds are added in quantities of 0.002 to 2 moles, preferably 0.005 to 1 mole, and particularly 0.01 to 0.6 mole, based on the cocatalyst component in the Ziegler-type catalyst. Additionally, the RX compound must be different than the catalytic compound and cocatalyst of the Ziegler-type catalyst employed for the polymerization proper.

When R is alkyl, cycloalkyl, aryl, aralkyl, or acyl, it is preferred for R to have not more than 30 carbon atoms.

In addition, it is preferred that the aryl group is hydrocarbon and that the acyl group is a derivative of the hydrocarbon carboxylic acid.

Unsaturated polymeric hydrocarbons include those produced from monomers having preferably 2 to 20, more preferably about 2 to 6 carbon atoms. For the polymerization proper, the Ziegler-type catalyst is generally composed of: (a) a catalytic compound of Groups IV, V or VIII of Mendeleev's Periodic Table, and (b) a cocatalyst capable of giving rise to hydride ions or carbanions, said cocatalyst being a hydride or organometallic compound (preferably an alkyl, aryl, or aralkyl compound, or the corresponding halides thereof), alkyl, aryl, or aralkyl metal halides, or halometal hydrides, the metal in both cases being selected from Groups II and III of Mendeleev's Periodic Table. The preferred mole ratio of (a) to (b) is 1:1 to 1:1500, more preferably 1:5 to 1:250. For more specific information regarding these Ziegler-type catalysts, attention is invited to the voluminous prior art teachings, such as "Linear and Stereoregular Addition Polymers," Gaylord and Mark, Interscience Publishers, New York (1959), particularly at pages 90–106.

As specific examples of suitable, unsaturated polymeric hydrocarbons, polybutadienes can be mentioned obtained by the polymerization of butadiene with the following two catalyst systems:

1. (a) Titanium compounds and (b) organometallic compounds, wherein there are preferably employed iodine-containing titanium compounds, or titanium tetrachloride and/or titanium tetrabromide, in the presence of iodine-yellow compounds; and 2. (a) Cobalt and/or nickel compounds and (b) organometallic compounds.

Further specific examples include polyisoprenes produceable with the aid of mixed catalysts of titanium compounds and organometallic compounds, as well as the ethylene/propylene copolymers obtainable with mixed catalysts of vanadium compounds and organometallic compounds, the latter copolymers containing a polyethylenically unsaturated third component, such as, for example, biscyclopentadiene.

In a number of these polymerization processes based on Ziegler-type catalysts considerable difficulties are encountered when attempting to produce polymers having viscosities substantially higher than ML–4=50. However, such polymers are today of special interest, particularly for the production of oil-plasticized rubber wherein ML–4 viscosities of preferably between 90 and 140 are required.

According to the present process, it is possible, in a simple manner, to increase the Mooney viscosities of the polymers for example from 20 to 50 or from 20 or 50 to 90–140. Thus, an advantage of this process resides in that the molecular weight can be kept low during the polymerization proper, whereby caking of polymers on the inner walls of the reaction vessels and pipelines can be substantially decreased. This advantage is particularly of value in solution polymerization processes wherein the corresponding polymer remains in solution and the viscosity of the reaction mixture is thereby increased with increasing conversion and increasing molecular weight.

Referring now to the attached drawing, it illustrates that it is possible, for example in the polymerization of butadiene with a catalyst system of cobalt compound and dialkyl aluminum chloride, to increase the solid contents during the polymerization process by decreasing the molecular weight, with the viscosity of the solution remaining the same. In this way, the efficiency of a polymerization plant can be correspondingly increased. The shaded area on the drawing represents the usual viscosity range within the solution polymerization is to be performed in an economical scale.

Then, after the polymerization proper is completed or the desired conversion is reached, the molecular weight of the polymer can be increased markedly in a subsequent step by adding a compound of the formula RX as previously defined.

Examples of compounds within the scope of this formula are primary, secondary, and tertiary alkyl or aryl halogenides, the alkyl groups preferably containing 1 to 20 carbon atoms; and the aryl group being preferably hydrocarbon aryl containing 1 to 20 carbon atoms. Preferred examples of halogenated hydrocarbons include ethyl chloride, cyclohexyl bromide, isopropyl chloride, phenylethyl chloromethane, triphenyl chloromethane, tert. butyl chloride, tert. butyl bromide, tert. hexyl chloride.

It was discovered that tertiary halogenides exhibit the strongest molecular weight-increasing effect, the secondary ones somewhat weaker, and the primary halogenides much weaker.

In addition to the above halogenated hydrocarbons, other halogenides can be employed, such as acyl halides of mono- or polybasic organic acids. Generally, the presence of one acyl halide function in the molecule is sufficient. The other carboxyl groups can, for example, be esterified, etherified, or can be present in the amide form. Exemplary compounds are phosgene, acetyl halides, the homologs and isomers thereof; benzoyl halides and the homologs thereof; phthalyl halides, and malonyl and adipyl halides; unsaturated acyl halides, and amino acyl halides. Other suitable halogenides include organic sulfur halogenides, such as, for example, sulfonyl halides, sulfinyl halides, as well as sulfur halogenides. In general, the number of carbon atoms in the acid residue is preferably about 1 to 20, more preferably about 1 to 12.

In addition to relatively low molecular weight halogenides, halogen-containing polymers are likewise suitable, such as, for example, polymers and copolymers of vinyl chloride, vinylidene chloride, or chloroprene. Likewise, there can be used halogenated and sulfo-halogenated polymeric hydrocarbons, such as, for example, those based on ethylene, propylene, butylene, styrene, and homologs and isomers thereof.

Still further, there can be used polymeric acid halogenides, such as polymers of chlorinated unsaturated carboxylic acids or copolymers of unsaturated acyl halides with other unsaturated compounds. These polymers can be produced conventionally, by homo- or copolymerization of halogen-containing, unsaturated compounds, or by halogenation or also sulfo-halogenation in either solution or solid form (for example fluid bed process) of polymers or by the halogenation of polymers having free carboxyl groups or sulfonic or sulfinic acid groups.

Aside from organic halogenides, halogens themselves can be employed. Suitable are not only chlorine, bromine, and iodine, but also mixed halogens, such as, for example, iodine chloride.

Still further, metallic and non-metallic halogenides which are either soluble per se or can be soulbilized in organic solvents are particularly useful as RX compounds, such as, for example, thionyl chloride, sulfuryl chloride, chromyl chloride, titanium tetrachloride, titanyl chloride, vanadium pentahalides, vanadium tetrachloride, vanadium oxychloride, phosphorus, trichloride, phosphorus oxychlorides, aresenic oxyhalides, antimony halides, antimony oxyhalides, sulfur halides, selenium halides, and, for example, halogen succinimide (a species of halogen-substituted imides). In place of the above-mentioned chlorides, the corresponding bromides and iodides are likewise active.

In addition to halogen compounds, likewise suitable are anhydrides of carboxylic acids, such as, for example, aliphatic and aromatic monocarboxylic acids, anhydrides of di-, tri-, etc. polycarboxylic acids, and also mixed anhydrides. Specific preferred examples are acetic acid anhydride, maleic acid anhydride, a mixed anhydride of acetic acid and stearic acid, and phthalic acid anhydride. The anhydride contains preferably 3 to 20 carbon atoms.

The addition of these compounds after the polymerization has been terminated, or after the desired final conversion has been reached, is done in such a manner that the compound, preferably in the form of a solution, is added all at once or in several batches at spaced intervals to the unsaturated polymer or mixture of different polymers. In case of batchwise addition, an even greater increase in the molecular weight occurs.

This molecular weight increase of the present invention takes place without an increase in the solid content. Thus, the increase in molecular weight is independent of the monomer concentration remaining in the polymerization starting material, the increase occurring when the monomer is completely absent. The extent of molecular weight increase is directly, but not necessarily linearly, proportional to the quantity of the added compound.

The temperature of the reaction mixture is preferably −50° to 100° C., and the molecular-weight-increasing compounds are preferably added at the polymerization temperature. After a reaction time which can be up to 10 or more hours, preferably not more than 10 minutes, and more preferably not more than one minute, the reaction mixture is worked up in a conventional manner, for example by destroying the catalyst with alcohol or ketones, precipitation of the polymer with alcohol, or driving off the solvent with steam.

A distinct advantage of the process of this invention is that of the polymolecular weight can be significantly increased by the timely addition of readily available compounds. Surprisingly, the advantageous properties of the polymers are completely retained. For example, the thus-produced high Mooney viscosity polymers are free from gel.

Without further elaboration, it is believed that one skilled in the art can, using the preceding description, utilize the present invention to its fullest extent. The following preferred specific embodiments are, therefore, to be construed as merely illustrative, and not limitative of the remainder of the specification and claims in any way whatsoever.

EXAMPLE 1

Under a nitrogen atmopshere, there are charged into a reaction vessel 1000 parts by weight of benzene, 100 parts by weight of 1,3-butadiene, 0.15 part by weight of 1,2-butadiene for controlling the molecular weight, and 1.5 parts by weight of diethyl aluminum chloride. The polymerization is initiated by the subsequent addition of 0.002 part by weight of cobalt octoate in the form of a 0.2% benzenic solution.

After a polymerization period of three hours, 90% of the monomer are converted. A benzenic solution of anhydrous ferric chloride is then added in a ratio of 0.4 mole ferric chloride per mole of the polymerization catalyst component diethyl aluminum chloride. After one hour, the ML-4 viscosity of the polymer is increased from an initial value of 46 to a value of 112. The decomposition of the catalyst is accomplished by the addition of acetone. The polymer is then isolated by precipitation with methanol, stabilized, and dried.

EXAMPLE 2

The polymerization and working-up operation of the polymer are conducted as in Example 1. The compounds employed for increasing the molecular weight, as well as their concentrations, are tabulated in Table I.

TABLE I

| Compound | Quantity of the compound in moles per mole of organo-metallic catalyst | ML-4 | $H_2O$ weight content in the polymer starting material (parts per million) | Remarks |
|---|---|---|---|---|
|  |  | 46 | 53 | Control run. |
| $SbCl_5$ | 0.2 | 112 | 53 |  |
| $SbCl_3$ | 0.2 | 114 | 53 |  |
|  |  | 45 | 56 | Do. |
| $Se_2Br_2$ | 0.1 | 58 | 56 |  |
|  |  | 55 | 55 | Do. |
| Allyl chloride | 0.07 | 140 | 55 |  |
| Do | 0.1 | >140 | 55 |  |
| $SiCl_4$ | 0.1 | 69 | 55 |  |
| $Br_2$ | 0.1 | 109 | 55 |  |
| $SnCl_4$ | 0.1 | 130 | 55 |  |
| "Hypalon 40" [1] | [2] 0.1 | 86 | 55 |  |
| Do.[1] | [2] 0.1 | 130 | 55 |  |
| Tosyl chloride | 0.05 | 102 | 55 |  |
|  |  | 58 | 52 | Do. |
| Succinic acid anhydride | 0.03 | 96 | 52 |  |
| Maleic acid anhydride | 0.03 | 80 | 52 |  |
|  |  | 60 | 53 | Do. |
| Chlorinated polystyrene (1.18% Cl) | [2] 5.0 | 105 | 53 |  |

[1] "Hypalon 40"=chlorinated and chlorosulfonated polyethylene.
[2] This quantity is percent by weight, based on the organometallic polymerization catalyst component.

By using organometallic catalyst components which contain, in place of the ethyl residue, other alkyl residues, or aryl residues, or aralkyl residues, substantially the same results are obtained.

EXAMPLE 3

The polymerization and working up of the polymer are conducted as in Example 1. Ethyl aluminum sesquichloride serves as the organo-metallic polymerization catalyst component.

TABLE II

| Compound | Quantity of the compound in moles per mole of organometallic catalyst | ML-4 | $H_2O$ weight content in the polymerization mixture (parts per million) | Remarks |
|---|---|---|---|---|
|  |  | 76 | 21 | Control run. |
| $SiCl_4$ | 0.1 | 144 | 21 |  |
| $TiCl_4$ | 0.1 | 111 | 21 |  |
| $SnCl_4$ | 0.1 | 136 | 21 |  |
|  |  | 53 | 8 | Do. |
| ICl | 0.1 | 91 | 8 |  |
| $PCl_3$ | 0.5 | 140 | 8 |  |
|  |  | 55 | 5 | Do. |
| Triphenylchloromethane | 0.1 | 70 | 5 |  |
| Acetic acid anhydride | 0.1 | 115 | 5 |  |
| Phthalic acid anhydride | 0.1 | 116 |  |  |

By using organometallic polymerization catalyst components which contain, instead of the ethyl residue, other alkyl residues or also aryl or aralkyl residues, substantially the same experimental results are achieved.

EXAMPLE 4

Into a nitrogen-purged reaction vessel, there are charged 1310 parts by weight of benzene, 2.37 parts by weight of titanium tetrachloride, and 2.29 parts by weight of triisobutyl aluminum; the mixture is stirred for 15 minutes at 30° C. so that the catalyst system can develop. Then, the polymerization process is initiated by the addition of 100 parts by weight of isoprene. After 3 hours, at a conversion of about 90%, the polymerization is practically completely. The ML-4 viscosity of the polymer is 38. Thereafter, a benzenic solution of tert.butyl chloride (1.8 mole per 12.5 moles of triisobutyl aluminum or titanium tetrachloride, both present in a molar proportion of 1:1 in the polymerization catalyst) is added in three batches at intervals of 15 minutes. After a total reaction time of 45 minutes, the catalyst is decomposed with acetone, and the polymer is precipitated by adding methanol containing, for stabilizing the polymer, 2% di-tert.butyl-p-cresol; subsequently, the polymer is dried. The ML-4 viscosity of the obtained product is 110.

EXAMPLE 5

The polymerization and working-up processes of the polymer are conducted as in Example 4. The compounds used for increasing the molecular weight are listed in Table III.

TABLE III

| Compound | ML-4 Before reaction | ML-4 After reaction |
|---|---|---|
| ICl | 29 | 85 |
| $ICl_3$ | 43 | 118 |
| $SOCl_2$ | 30 | 69 |
| $SO_2Cl_2$ | 34 | 105 |
| $VOCl_3$ | 36 | 60 |
| $PCl_5$ | 30 | 88 |
| NOBr | 30 | 58 |
| $Se_2Br_2$ | 31 | 52 |
| $CrO_2Cl_2$ | 45 | 63 |
| Benzyl chloride | 33 | 86 |
| Benzotrichloride | 36 | 73 |
| Triphenyl chloromethane | 36 | 64 |
| Bromobenzene | 38 | 76 |
| Tetrachlorocrotonyl chloride | 45 | 115 |
| Benzoyl chloride | 37 | 68 |
| p-Toluenesulfonyl chloride | 50 | 80 |
| Maleic acid anhydride | 36 | 68 |
| $SiCl_4$ | 41 | 68 |
| Dimethyl dichlorosilane | 23 | 61 |
| Trimethyl chlorosilane | 37 | 68 |
| $I_2$ | 32 | 74 |
| Chlorinated polystyrene (8% $Cl_2$) | 27 | 39 |
| Chlorosulfonic acid | 36 | 78 |

EXAMPLE 6

In a continuously operating polymerization plant for producing a copolymer of ethylene, propylene, and biscyclopentadiene, 1900 parts by weight of hexane as the solvent, 37 parts by weight of ethylene, 58 parts by weight of propylene, and 5 parts by weight of biscyclopentadiene are charged per unit of time into the reaction vessel. The polymerization is kept continuous by the addition of 2.15 parts by weight of ethyl aluminum sesquichloride and 0.25 part by weight of vanadium oxychloride. The obtained polymer has an ML-4 viscosity of 60.

Before decomposing the catalyst, maleic acid anhydride is added to the reaction mixture in a ratio of 0.08 mole per mole of ethyl aluminum sesquichloride. After a reaction time of one hour, the catalyst is decomposed with an excess quantity of acetone (3 moles per mole of ethyl aluminum sesquichloride), and the polymer is worked up by precipitation with methanol. The ML-4 viscosity of the product is 80.

The preceding examples can be repeated with similar success by substituting the generically and specifically described reactants and opearting conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and intended to be, within the full range of equivalence of the following claims.

In the following claims, the term "unsaturated polymeric hydrocarbons" defines polymers which have more than terminal unsaturation, having preferably at least 0.1 and more preferably at least 3 double bonds per 1,000 carbon atoms in each polymer.

What is claimed is:

1. In a process for the production of unsaturated polymeric hydrocarbons which comprises the polymerization of at least one conjugated diolefin having four to five carbon atoms in an inert organic solvent in the presence of a Ziegler-type catalyst composed of:
   (a) a catalytic compound of an element selected from the group consisting of Groups IV, V, and VIII of Mendeleev's Periodic Table; and
   (b) a cocatalyst selected from the group consisting of a hydride and an organometallic compound of a metal of Groups II and III of Mendeleev's Periodic Table, said organometallic compound being an alkyl, an aryl, or an aralkyl compound, or the corresponding halides thereof;
   the improvement which comprises after the desired conversion has been reached, increasing the molecular weight of the resultant polymer by the subsequent step of adding to the resultant reaction solution containing said resultant polymer residual monomer Ziegler-type catalyst and inert organic solvent, a halogen compound soluble in said inert solvent, said halogen compound being selected from the group consisting of an alkyl, aryl or aralkyl halogenide, and an acyl halide, said halogen compound being added in a molar proportion of 0.002-2 based on one mol of said cocatalyst compound (b) used in the polymerization step, and with the provision that said halogen compound is different from said catalytic compound and said cocatalyst, said subsequent step being conducted at $-50$ to $100°$ C. for a sufficient time to increase the Mooney viscosity of the polymer.

2. A process as defined by claim 1, wherein said catalytic compound (a) is a compound of titanium or cobalt.

3. A process as defined by claim 2, wherein said cocatalyst (b) in an organometallic compound of aluminum.

4. A process as defined by claim 1, wherein said catalytic compound (a) is cobalt octoate or titanium tetrachloride and cocatalyst (b) is diethyl aluminum chloride, ethyl aluminum sesquichloride or triisobutyl aluminum.

5. A process as defined by claim 1, wherein said Ziegler-type catalyst consists only of said catalytic compound and said cocatalyst.

6. A process as defined by claim 5, wherein said halogen compound is allyl chloride or tosyl chloride.

7. A process as defined by claim 6, wherein said at least one conjugated diolefin is only butadiene.

8. A process as defined by claim 1, wherein said at least one conjugated diolefin is only isoprene.

9. A process as defined by claim 5, wherein the addition of said halogen compound does not effect polymerization of butadiene to solid polymers.

References Cited

UNITED STATES PATENTS

| | | | |
|---|---|---|---|
| 2,560,164 | 7/1951 | Garber | 260—85.3 |
| 3,081,288 | 3/1963 | Edmonds | 260—93.7 |
| 3,211,710 | 10/1965 | Hendricks | 260—85.3 |
| 3,328,376 | 5/1967 | Berremann et al. | 260—94.3 |
| 3,545,680 | 7/1969 | Okuya et al. | 260—94.3 |

FOREIGN PATENTS

| | | |
|---|---|---|
| 992,210 | 5/1965 | England. |
| 647,034 | 8/1964 | Belgium. |
| 644,501 | 6/1964 | Belgium. |

OTHER REFERENCES

Molecular Weight, Jump, Reaction by Engel et al., Rubber Age, December 1964, pp. 410–415.

Friedel-Crafts & Related Reactions by Olah Interscience, vol. I (1963), pp. 88–90; vol. II (1964), pp. 1294–1295.

High Molecular-Weight Polybutadiene by Jump Reaction; Engel et al., Rubber & Plastics Age, December 1964, pp. 1499–1502, 1504.

JAMES A. SEIDLECK, Primary Examiner

W. F. HAMROCK, Assistant Examiner

U.S. Cl. X.R.

260—80.78, 82.1, 85.1, 94.7 HA, 96